US009574419B2

(12) United States Patent
James (10) Patent No.: US 9,574,419 B2
(45) Date of Patent: *Feb. 21, 2017

(54) METHODS FOR COMPLETING SUBTERRANEAN WELLS (75) Inventor: Simon Gareth James, Le Plessis-Robinson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 418 days.

This patent is subject to a terminal disclaimer.

(21) Appl. No.: 13/595,988

(22) Filed: Aug. 27, 2012

(65) Prior Publication Data

US 2014/0054037 A1    Feb. 27, 2014

(51) Int. Cl.
| E21B 33/14 | (2006.01) |
| E21B 17/00 | (2006.01) |
| E21B 17/10 | (2006.01) |
| C04B 28/02 | (2006.01) |
| C09K 8/467 | (2006.01) |
| C22C 33/02 | (2006.01) |

(52) U.S. Cl.
CPC ............... *E21B 33/14* (2013.01); *C04B 28/02* (2013.01); *C09K 8/467* (2013.01); *E21B 17/00* (2013.01); *E21B 17/1085* (2013.01); *C22C 33/0285* (2013.01)

(58) Field of Classification Search
CPC .......... E21B 33/13; E21B 33/14; E21B 36/00; E21B 17/00; E21B 17/085; C09K 8/42; C04B 14/34; C22C 33/0285
USPC ................. 166/293, 292, 285, 250.06, 272.3
See application file for complete search history.

(56) References Cited

U.S. PATENT DOCUMENTS

| 3,373,811 | A   |   | 3/1968  | Burtch |
| 3,861,469 | A   | * | 1/1975  | Bayless et al. ............... 166/303 |
| 4,412,863 | A   |   | 11/1983 | Neely, Jr. |
| 4,495,997 | A   | * | 1/1985  | Scott ...................... E21B 33/14 |
|           |     |   |         | 166/242.1 |
| 4,663,104 | A   |   | 5/1987  | Ito et al. |
| 7,441,599 | B2  |   | 10/2008 | Hermes et al. |
| 7,490,668 | B2  |   | 2/2009  | Bour |
| 7,743,830 | B2  |   | 6/2010  | Hermes et al. |
| 7,870,905 | B2  |   | 1/2011  | Hermes et al. |
| 7,950,460 | B2  |   | 5/2011  | Hermes et al. |
| 7,963,333 | B2  |   | 6/2011  | Hermes et al. |

(Continued)

FOREIGN PATENT DOCUMENTS

WO    95/21063    8/1995

OTHER PUBLICATIONS

Nelson Eb and Guillot D (eds.): Well Cementing, 2nd Edition, Schlumberger (2006).

(Continued)

*Primary Examiner* — Yong-Suk (Philip) Ro
(74) *Attorney, Agent, or Firm* — Andrea E. Tran (57) ABSTRACT

Methods for cementing a subterranean well comprise installing a casing string into a borehole, wherein the casing string comprises a metal having a coefficient of thermal expansion (CTE) lower than about $6 \times 10^{-6}$/° C. A cement sheath is then placed between the exterior surface of the casing string and the formation wall. The low-CTE metal may reduce casing shrinkage when the well temperature falls during stimulation treatments, cyclic steam injection or when the well temperature reaches equilibrium at the top of a long casing string.

17 Claims, 5 Drawing Sheets

(56) References Cited

U.S. PATENT DOCUMENTS

| | | | |
|---|---|---|---|
| 8,689,894 B2* | 4/2014 | Regnault de la Mothe et al. | 166/387 |
| 9,096,467 B2* | 8/2015 | James | C04B 28/02 |
| 2009/0133878 A1 | 5/2009 | Hermes et al. | |
| 2012/0125640 A1 | 5/2012 | Sevre | |

OTHER PUBLICATIONS

Thiercelin MJ et al.: "Cement Design Based on Cement Mechanical Response," SPE Drilling & Completion 13 (4) Dec. 1998, 266-273.
Tucker MG et al.: "Negative Thermal Expansion in $ZrW_2O_8$: Mechanisms, Rigid Unit Modes, and Neutron Total Scattering," Phys. Rev. Lett. 95, 255501 (2005).
International Search Report and Written Opinion for the equivalent PCT patent application No. PCT/US13/056098 issued on Jan. 17, 2014.

* cited by examiner

METHODS FOR COMPLETING SUBTERRANEAN WELLS

BACKGROUND

The statements in this section merely provide background information related to the present disclosure and may not constitute prior art.

This disclosure relates to equipment and methods for completing subterranean wells; in particular, wells in which large temperature fluctuations may occur.

During completion of a subterranean well, drilling and cementing operations are performed to provide a conduit through which desirable fluids originating within the formation may flow. The cementing operation involves placing a competent cement sheath inside the annular region between the external surface of a tubular body such as well casing, and the borehole wall. The cement sheath supports the casing and provides a hydraulic seal between producing formations. The presence of a hydraulic seal is commonly called zonal isolation.

Well cementing is a difficult operation because it requires several parameters to be considered and controlled. Such parameters include density, setting time, rheological properties, fluid-loss rate, set-cement strength and permeability. Control of these parameters is inherent to any well-cementing operation, and is well known to the skilled person. Solutions generally involve incorporating various additives into the cement slurry. Detailed information about well cementing may be found in the following publication: Nelson EB and Guillot D (eds.): *Well Cementing, $2^{nd}$ Edition*, Schlumberger (2006).

When well cementing is successful, and a cement sheath has been formed that provides casing support and zonal isolation once the slurry has set and hardened, it may not be long before the sheath is subjected to mechanical and/or thermal stresses that can lead to deterioration. Cement systems employed in thermal-recovery wells are particularly prone to problems that lead to loss of zonal isolation. One type of thermal-recovery well involves the injection of steam into the wellbore, commonly known as steamflooding. Steamflooding may consist of introducing steam into an injection well and sending the steam through the formation to one or more production wells. Another technique involves cyclic steam injection, during which steam is injected into a single well for a limited period. After the steam-injection period, the well is placed into production. Heating the reservoir reduces the viscosity of oil in the formation, making production more efficient. Steamflood wells are usually less than 915 m (3000 ft) deep, and are frequently deviated (30° to horizontal). The circulating temperatures during primary-cementing operations are often less than 40° C. (104° F.). During injection, the steam temperature usually approaches about 315° C. (600° F.).

When heat is initially supplied, the temperature rise is normally controlled to prevent undue thermal shock to the casing and cement. Nevertheless, because of thermal expansion, high levels of stress are built up in the pipe and the cement sheath.

A substantial amount of work has been performed for many years to devise cementing techniques that minimize the effects of thermal expansion. Such methods include the placement of thermal packers and the inclusion of a sliding sleeve in the casing string that can move freely in response to thermal stress. Another procedure involves holding the casing in tension during primary cementing to minimize expansion when thermal stress is eventually applied.

More recently, a method was developed that involves applying internal casing pressure after the primary cementing has been performed, and while the cement slurry is settting and hardening. The internal pressure may vary from about 15.9 MPa to 138 MPa (2300 psi to 20,000 psi). This process prestresses the casing, and gives the cement sheath an improved ability to withstand the application of heat during the steam-injection process. Modeling software is used to analyze the anticipated well conditions during steam production, and determine the optimal amount of casing pressurization. All of the above techniques have aimed at maintaining zonal isolation.

Expanding cements have also been proposed in an effort to preserve intimate cement/casing and cement/formation bonding during all stages of the well's life. Unfortunately, when the formation is weak (a common occurrence in steamflood wells), expansion may cause the cement sheath to move away from the casing, creating a microannulus. For this reason, expanding cements for thermal recovery wells are generally not recommended.

SUMMARY

Improved cementing techniques in the realm of steam-injection wells and other wells in which large temperature fluctuations occur would be advantageous.

The present disclosure provides improved compositions and methods for cementing thermal-recovery wells and maintaining zonal isolation during production.

In an aspect, embodiments relate to methods for cementing a subterranean well having a borehole. A casing string is installed in the borehole, the casing string comprising a metal having a coefficient of thermal expansion lower than $9 \times 10^{-6}/°$ C. A cement sheath is placed between the exterior surface of the casing string and the formation wall, or between the exterior surface of the casing string and another casing string.

In a further aspect, embodiments relate to methods for establishing and maintaining zonal isolation in a subterranean well having a borehole. A casing string is installed in the borehole, the casing string comprising a metal having a coefficient of thermal expansion lower than $9 \times 10^{-6}/°$ C. A cement sheath is placed between the exterior surface of the casing string and the formation wall, or between the exterior surface of the casing string and another casing string.

In yet a further aspect, embodiments relate to well-construction methods. A borehole is drilled into the earth, thereby forming a subterranean well. A casing string is installed in the borehole, the casing string comprising a metal having a coefficient of thermal expansion lower than $9 \times 10^{-6}/°$ C. A cement sheath is placed between the exterior surface of the casing string and the formation wall, or between the exterior surface of the casing string and another casing string.

DETAILED DESCRIPTION

At the outset, it should be noted that in the development of any such actual embodiment, numerous implementations or specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the compositions used/disclosed herein can also comprise some components other than those cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific points, it is to be understood that inventors appreciate and understand that any and all data points within the range are to be considered to have been specified, and that Applicant possessed knowledge of the entire range and all points within the range.

As discussed earlier, it would be advantageous to improve cement-design, primary-cementing and completion methods for wells in which large temperature fluctuations occur.

It was disclosed that, when particles with a thermal expansion coefficient (CTE) higher than set cement are incorporated into the cement, the resulting CTE of the composite increases. A higher CTE is beneficial in situations during which the well temperature is artificially increased (e.g., steam-injection wells). A composite cement system with the higher CTE may expand in a similar fashion to the casing, thereby reducing the stresses induced in the cement sheath.

However, there are situations during which the casing and cement may experience a temperature decrease. For example, cold fluids may be injected into subterranean formations during hydraulic fracturing operations, or to maintain reservoir pressure. In other cases involving long casing strings or long liners, the cement at the top may initially be hotter as it sets than the surrounding formation. In addition to the heat of cement hydration, the slurry would have been further heated during its journey along the bottom of the string. As the casing-cement-formation system returns to equilibrium, the temperature decreases. In cyclic steam injection wells, both heating and cooling occur, presenting a particular well-cementing challenge.

As a well cools the casing may shrink, whereas the diameter of the wellbore remains effectively constant. Therefore, the annular space between the casing and the formation wall may increase. In addition, the cement-sheath thickness may decrease because of thermal contraction. The CTE of standard set Portland cement is approximately $9 \times 10^{-6}/°$ C. In a typical configuration (7-in. casing (17.8 cm) in an 8.5-in. (21.6 cm) open hole), a 50° C. temperature reduction will reduce the cement thickness by about 9 µm A 9 µm gap may be sufficient to allow interzonal communication.

The Applicant has discovered that it is possible to reduce the thermal contraction of the cement sheath by adding fillers with very low or negative CTEs to the cement slurry. The composite system may then have a CTE that is between that of the cement matrix and that of the filler inclusions.

A non-limiting example of a filler with a low thermal expansion coefficient is INVAR™ (available from Imphy Alloys, France)—a nickel/iron alloy containing 36 wt % Ni and 64 wt % Fe. Depending on the purity of the alloy, the CTE may be as low as $0.6 \times 10^{-6}/°$ C.

A non-limiting example of a filler with a negative CTE is zirconium tungstate-$Zr(WO_4)_2$. This material has a CTE of approximately $-7 \times 10^{-6}/°$ C. The negative value indicates that the material expands when cooled and contracts when heated.

Both INVAR™ and $Zr(WO_4)_2$ maintain their CTEs over a temperature range that is useful for well cementing applications: 20° C. to 100° C. for INVAR™ and up to 700° C. for $Zr(WO_4)_2$. Table 1 presents calculated CTEs for composite Portland cement systems containing either INVAR™ or $Zr(WO_4)_2$. The CTEs are volume weighted averages of the filler and matrix.

TABLE 1

Predicted thermal expansion coefficients for cement systems containing INVAR ™ or $Zr(WO_4)_2$ as fillers.

| | Composite thermal expansion coefficients ($\times 10^{-6}/°$ C.) | |
|---|---|---|
| Filler (vol %) | INVAR ™ | $Zr(WO_4)_2$ |
| 0 | 9.0 | 9.0 |
| 10 | 8.2 | 7.4 |
| 20 | 7.3 | 5.8 |
| 30 | 6.5 | 4.2 |
| 40 | 5.6 | 2.6 |
| 50 | 4.8 | 1.0 |
| 60 | 4.0 | −0.6 |
| 70 | 3.1 | −2.2 |

Figure 1A:
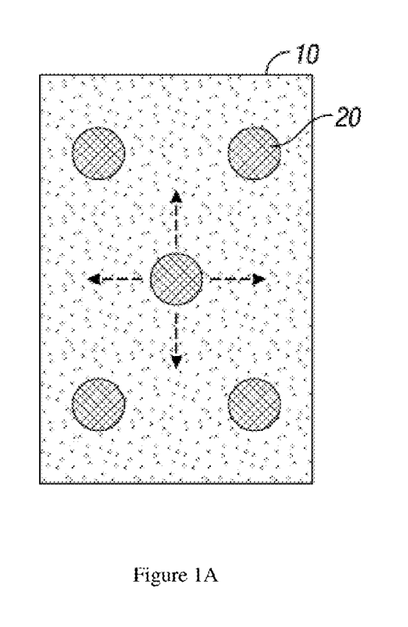
FIGS. 1A and 1B illustrate the mechanism by which fillers with low thermal expansion coefficients may behave in a cement matrix.
Figure 1B:
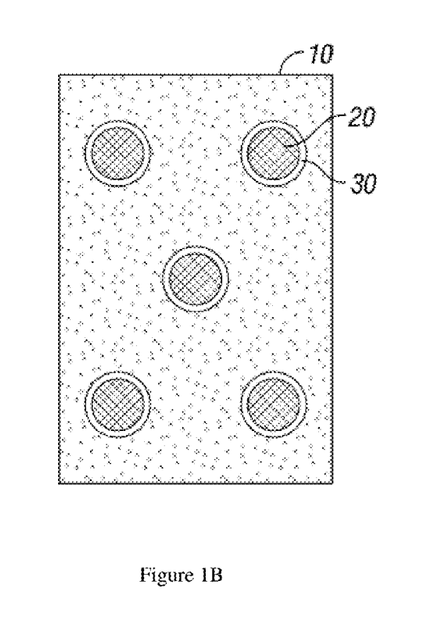

When low- or negative-CTE materials are present as fillers, the useful effect may only be present when the temperature falls. This effect is illustrated in FIGS. 1A and 1B. FIG. 1A illustrates what may occur when the temperature decreases. The cement matrix 10 shrinks onto the filler particles 20, and the filler may prevent further shrinkage. For example, if a 50° C. temperature reduction occurs, and the composite system contains 50 vol % $Zr(WO_4)_2$, the CTE may be $1.0 \times 10^6/°$ C. and the cement thickness may decrease by only 1 µm (assuming the same well geometry described earlier). In a more extreme case in which 70 vol % $Zr(WO_4)_2$ is present, the cement composite may expand upon 50° C. cooling by 2 µm, thereby producing a pre-stress in the set cement.

When the temperature increases (FIG. 1B), the matrix may expand to a greater extent than the filler particles (in the case of $Zr(WO_4)_2$ the filler may shrink), leaving void spaces 30 between the filler particles and the matrix. In such cases, because the filler particles are no longer in contact with the matrix, the CTE may become that of the matrix.

Figure 4A:
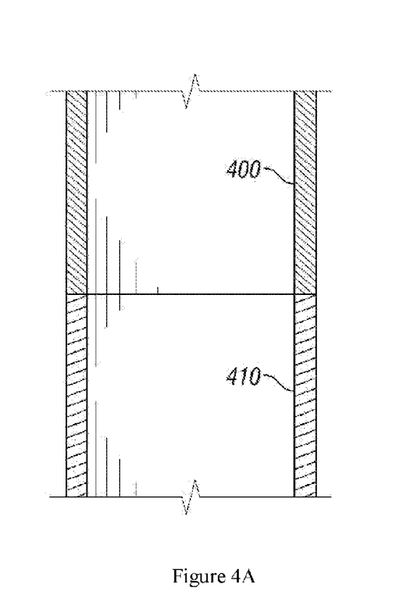
FIG. 4A shows a casing string that comprises both INVAR™ alloy and conventional casing.
Figure 4B:
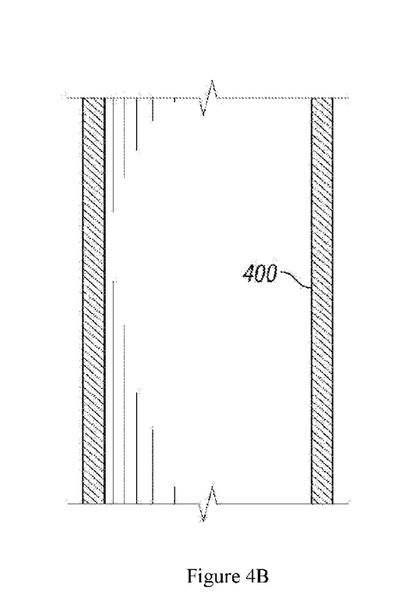
FIG. 4B shows a casing sting that is entirely made of INVAR™ alloy.
Figure 4C:
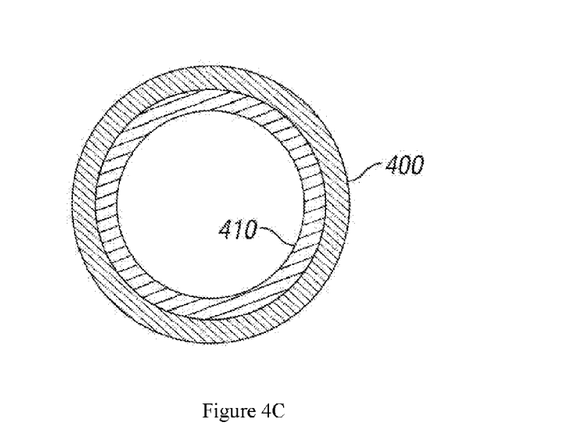
FIG. 4C shows a casing cross section wherein convention casing is surrounded by a layer of INVAR™ alloy.

Another technique by which low- or negative-CTE materials may be employed to improve zonal isolation may be to incorporate low-CTE metals in one or more casing strings. In such applications, the CTE of the metal may be lower than about $9 \times 10^{-6}/°$ C., or lower than about $6 \times 10^{-6}/°$ C., or lower than about $3 \times 10^{-6}/°$ C. In a non-limiting example shown in FIGS. 4A-4C, INVAR™ alloy 400 may be used to fabricate lengths of casing string. Such casing strings may be present in the well along with conventional casing 410 (FIG. 4A), or the entire casing string may be made from INVAR™ alloy (FIG. 4B). Alternatively, conventional casing may include an outer layer composed of INVAR™ alloy (FIG. 4C). When steam is injected into the well, the casing comprising INVAR™ alloy may not expand significantly as the temperature increases, and there may be significantly less stress induced in the cement sheath. The CTEs of INVAR™ alloy at various temperatures are given in Table 2.

TABLE 2

Coefficients of thermal expansion for INVAR ™ alloy at various temperatures.

| Temperature | | CTE | |
|---|---|---|---|
| ° F. | ° C. | $(\times 10^{-6}/°$ F.) | $(\times 10^{-6}/°$ C.) |
| 200 | 93 | 0.72 | 1.30 |
| 300 | 149 | 1.17 | 2.11 |
| 500 | 260 | 2.32 | 4.18 |
| 700 | 371 | 4.22 | 7.60 |

Another low-CTE metal that may be used in the present application is KOVAR™ alloy—a Fe/Ni/Co alloy available from Carpenter Technology Corporation, Reading, Pa., USA. The alloy comprises about 46% Fe, 29% Ni and 17 wt % Co. The CTE of KOVAR™ alloy may vary from about $4.9 \times 10^{-6}/°$ C. and $6.2 \times 10^{-6}/°$ C.

Yet another metal that may be used in the present application is OSPREY™ alloy—a silicon/aluminum alloy available from Sandvik Materials Technology, Sandviken, Sweden. The alloy may comprise between 27% and 70% Si. The CTE of OSPREY™ alloy may vary from about $7.4 \times 10^{-6}/°$ C. and $16.8 \times 10^{-6}/°$ C.

Alternatively, the low-CTE metal may be present as a coating around conventional casings. Conventional casings may comprise (but not be limited to) carbon steel, stainless steel, titanium, INCONEL™ and MONEL™. INCONEL™ is an alloy composed primarily of nickel and chromium, and is available from Special Metals Corporation. MONEL™ is an alloy composed primarily of nickel (up to 67%) and copper, and is available from Special Metals Corporation.

In an aspect, the disclosure relates to methods for cementing a subterranean well having a borehole. The well may be a steam injection well. A casing string is installed in the borehole, and a cement sheath is placed between the exterior surface of the casing and the formation wall, or between the exterior surface of the casing string and another casing string.

The casing string may comprise a metal having a coefficient of thermal expansion lower than about $6 \times 10^{-6}/°$ C. The metal may comprise an alloy comprising between about 32 wt % and 42 wt % Ni and between about 58 wt % and about 68 wt % Fe, or an alloy comprising about 46 wt % Fe, 29 wt % Ni and 17 wt % Co.

The metal may also be present as a coating that covers the outside surface of the casing. Under these circumstances, the casing may comprise carbon steel, stainless steel, titanium, INCONEL™ alloy or MONEL™ alloy. Alternatively, one may provide a casing string comprising at least one section comprising the metal and at least one section of casing comprising carbon steel, stainless steel, titanium, INCONEL™ alloy or MONEL™ alloy.

The cement sheath may also comprise water, an inorganic cement and one or more fillers having a thermal expansion coefficient lower than about $3 \times 10^{6}/°$ C. The filler may comprise zirconium tungstate, or an alloy comprising between about 36 wt % and 38 wt % Ni and about 62 wt % and 64 wt % Fe, or a combination thereof. The filler concentration may be between about 1 wt % and 75 wt % by weight of cement, or between about 5 wt % and 50 wt %. The average particle size of the filler may be between about 10 μm and 500 μm, or between about 50 μm and 250 μm. When used in subterranean applications, the compositions may be pumpable. Those skilled in the art will recognize that a pumpable fluid in the context of well cementing has a viscosity lower than about 1000 mPa-s at a shear rate of 100 $s^{-1}$ at the temperatures to which the fluid is exposed during a cementing operation, and during the time necessary to place the composition in the well.

In a further aspect, embodiments relate to methods for establishing and maintaining zonal isolation in a subterranean wellbore. The well may be a steam injection well. A casing string is installed in the borehole, and a cement sheath is placed between the exterior surface of the casing and the formation wall, or between the exterior surface of the casing string and another casing string.

The casing string may comprise a metal having a coefficient of thermal expansion lower than about $6 \times 10^{-6}/°$ C. The metal may comprise an alloy comprising between about 32 wt % and 42 wt % Ni and between about 58 wt % and about 68 wt % Fe, or an alloy comprising about 46 wt % Fe, 29 wt % Ni and 17 wt % Co.

The metal may also be present as a coating that covers the outside surface of the casing. Under these circumstances, the casing may comprise carbon steel, stainless steel, titanium, INCONEL™ alloy or MONEL™ alloy. Alternatively, one may provide a casing string comprising at least one section comprising the metal and at least one section of casing comprising carbon steel, stainless steel, titanium, INCONEL™ alloy or MONEL™ alloy.

The cement sheath may also comprise water, an inorganic cement and one or more fillers having a thermal expansion coefficient lower than about $3 \times 10^{-6}/°$ C. The filler may comprise zirconium tungstate, or an alloy comprising between about 36 wt % and 38 wt % Ni and about 62 wt % and 64 wt % Fe, or a combination thereof. The filler concentration may be between about 1 wt % and 75 wt % by weight of cement, or between about 5 wt % and 50 wt %. The average particle size of the filler may be between about 10 μm and 500 μm, or between about 50 μm and 250 μm.

Figure 5A:
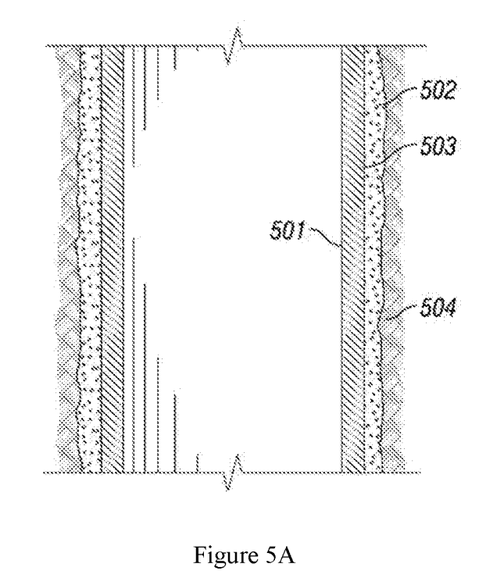
FIG. 5A shows a casing string with a cement sheath between the exterior surface of the casing string and the formation wall.
Figure 5B:
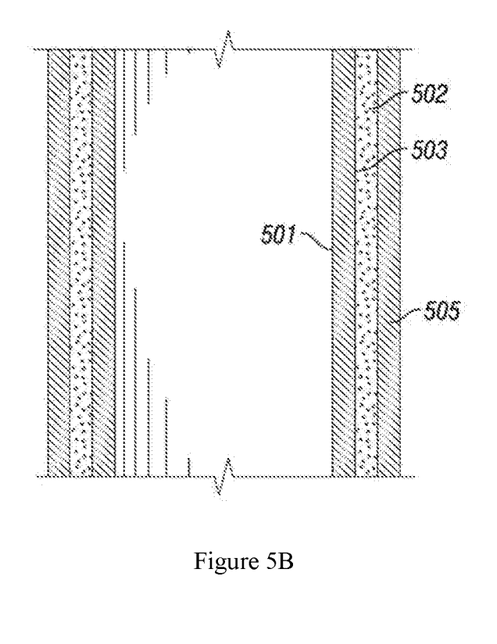
FIG. 5B shows a casing string with a cement sheath between the exterior surface of the casing string and another casing string.

In yet a further aspect, the disclosure relates to well-construction methods. A borehole is drilled into the earth, thereby forming a subterranean well. A casing string 501 is installed in the borehole, and a cement sheath 502 is placed between the exterior surface 503 of the casing and the formation wall 504 (FIG.5A), or between the exterior surface 503 of the casing string and another casing string 505 (FIG.5B).

The casing string may comprise a metal having a coefficient of thermal expansion lower than about $6 \times 10^{-6}/°$ C. The metal may comprise an alloy comprising between about 32 wt % and 42 wt % Ni and between about 58 wt % and about 68 wt % Fe, or an alloy comprising about 46 wt % Fe, 29 wt % Ni and 17 wt % Co.

The metal may also be present as a coating that covers the outside surface of the casing. Under these circumstances, the casing may comprise carbon steel, stainless steel, titanium, INCONEL™ alloy or MONEL™ alloy. Alternatively, one may provide a casing string comprising at least one section comprising the metal and at least one section of casing comprising carbon steel, stainless steel, titanium, INCONEL™ alloy or MONEL™ alloy.

The cement sheath may also comprise water, an inorganic cement and one or more fillers having a thermal expansion coefficient lower than about $3 \times 10^{-6}/°$ C. The filler may comprise zirconium tungstate, or an alloy comprising between about 36 wt % and 38 wt % Ni and about 62 wt % and 64 wt % Fe, or a combination thereof. The filler concentration may be between about 1 wt % and 75 wt % by weight of cement, or between about 5 wt % and 50 wt %. The average particle size of the filler may be between about 10 μm and 500 μm, or between about 50 μm and 250 μm.

For all aspects, the inorganic cement may comprise Portland cement, calcium aluminate cement, lime-silica blends, zeolites, geopolymers, Sorel cements, chemically bonded phosphate ceramics, cement-kiln dust and combinations thereof.

The compositions disclosed may further comprise dispersing agents, fluid-loss-control agents, set retarders, set accelerators, foaming agents, gas generating agents, antifoaming agents, extenders, swellables particles, weighting agents, lost-circulation control agents and combinations thereof.

EXAMPLE

The following examples serve to further illustrate the disclosure.

Example 1

Several simulations were performed to calculate the effects of adjusting the casing CTE on cement-sheath integrity. The simulator employed in the present study is described in the following publication. Thiercelin M J et al.: "*Cement Design Based on Cement Mechanical Response,*" *SPE Drilling & Completion* 13 (4) December 1998, 266-273. The simulator input parameters are given in Table 3. The temperature increase is assumed to be from 30° C. to 270° C. in 10 minutes.

TABLE 3

| Input parameters for cement-sheath-failure simulations. | |
| --- | --- |
| Open hole | 8.5 inch |
| Casing | 7 inch, 38.7 kg/m³ |
| Standoff | 100% |
| Casing | |
| Young's modulus | 200,000 MPa |
| Poisson's ratio | 0.27 |
| CTE | 1 to 13 × $10^{-6}/°$ C. |
| Temperature ramp | 30 to 270° C. in 10 minutes |
| Rock | |
| Young's modulus | 7000 MPa |
| Poisson's ratio | 0.3 |
| CTE | 13 × $10^{-6}$ ° C.$^{-1}$ |
| Cement | |
| UCS | 48 MPa |
| Tensile strength | 4.8 MPa |
| Young's modulus | 8500 MPa |
| Poisson's ratio | 0.15 |
| CTE | 9 × $10^{-6}/°$ C. |

Figure 2:
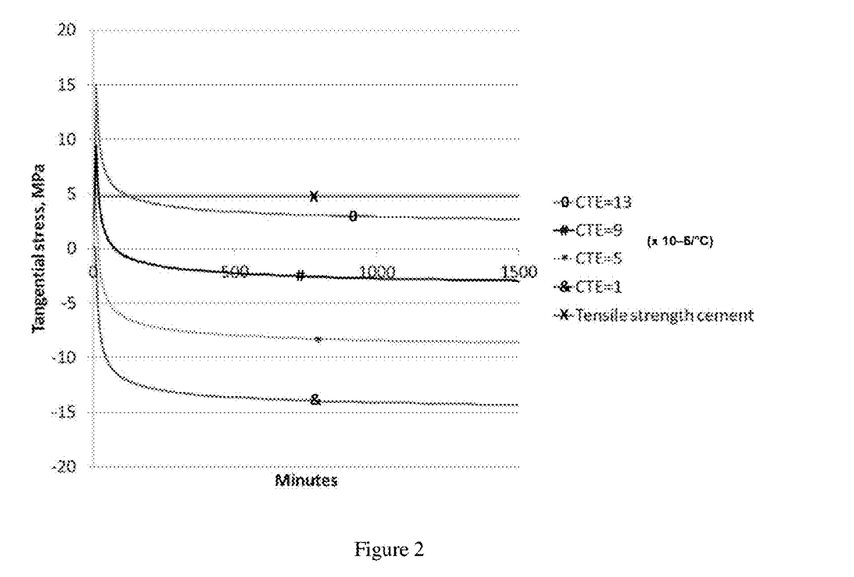
FIG. 2 shows the simulated effect of the casing thermal expansion coefficient on cement sheath integrity.

The results of the simulations are shown in FIG. 2. It can be seen that, for this particular scenario, a risk of cement sheath tensile failure exists if the casing CTE exceeds about $5 \times 10^{-6}/°$ C. At higher CTEs, the maximum tangential stress generated in the cement sheath exceeds the cement tensile strength.

Example 2

Several simulations were performed to calculate the effects of cooling a well on the size of a casing/cement microannulus. The CTE of the cement sheath was varied. The casing had a low CTE-$1.3 \times 10^{-6}/°$ C. Two simulators were employed in the present study. One is described in the following publication. Thiercelin M J et al.: "*Cement Design Based on Cement Mechanical Response,*" *SPE Drilling & Completion* 13 (4) December 1998, 266-273. The other is a finite element analysis model (ABAQUS™, available from ABAQUS Inc.). The simulations correspond to a cooling of the well (e.g., due to water injection). Three cases were simulated.
 1. Conventional Cement: CTE=$9 \times 10^{-6}/°$ C.
 2. Low CTE Cement: CTE=$2 \times 10^{-6}/°$ C.
 3. Negative CTE Cement: CTE=$-2 \times 10^{-6}/°$ C.

The rest of the simulator input parameters are given in Table 4.

TABLE 4

| Input parameters for simulations involving different cement-sheath CTEs. | |
| --- | --- |
| Open hole | 8.5 inch |
| Casing | 7 inch, 38.7 kg/m |
| Standoff | 100% |
| Casing | |
| Young's modulus | 200000 MPa |
| Poisson's ratio | 0.27 |
| CTE | 1.3 × $10^{-6}/°$ C. |
| Temperature ramp | 100 to 50° C. in 50 minutes |
| Rock | |
| Young's modulus | 24000 MPa |
| Poisson's ratio | 0.25 |
| CTE | 13 × $10^{-6}/°$ C. |
| Cement | |
| Unconfined Compressive Strength | 48 MPa |
| Tensile strength | 4.8 MPa |
| Young's modulus | 8500 MPa |
| Poisson's ratio | 0.15 |

Figure 3:
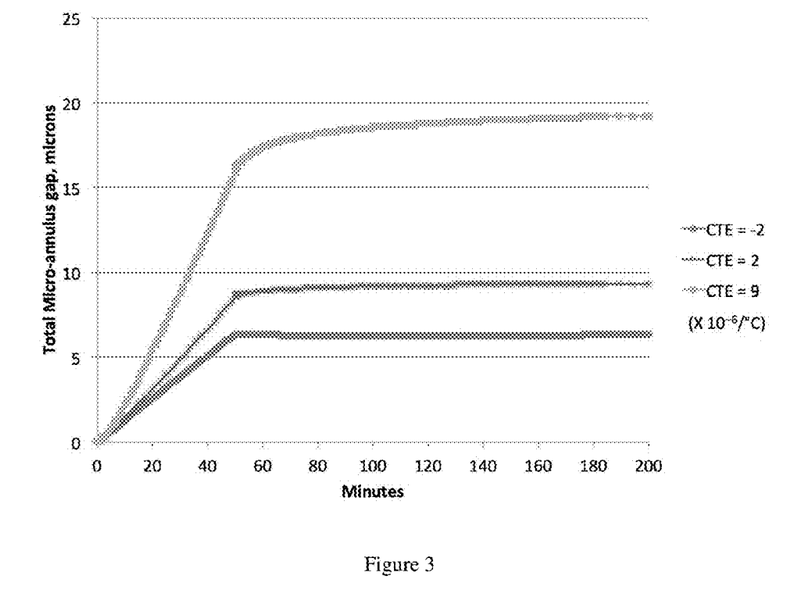
FIG. 3 shows the results of simulations showing the effect of cement thermal expansion coefficient on the size of a microannulus resulting from cooling the well.

The results of the simulation are shown in FIG. 3, which shows the microannulus-gap sizes that may be observed upon well cooling. The total microannulus gap is the sum of the widths of both the inner and the outer microannuli. As the CTE of the cement decreases and becomes negative, the cumulative size of the microannulus falls below 10 µm.

Although various embodiments have been described with respect to enabling disclosures, it is to be understood that the preceding information is not limited to the disclosed embodiments. Variations and modifications that would occur to one of skill in the art upon reading the specification are also within the scope of the disclosure, which is defined in the appended claims.

The invention claimed is:

1. A method for cementing a subterranean well having a borehole and a formation wall, comprising:
 (i) installing into the borehole a casing string having a coating that covers an outside surface of the casing string, the coating comprising a metal having a coefficient of thermal expansion lower than $9\times10^{-6}/°$ C.; and
 (ii) placing a cement sheath between the exterior surface of the casing string and the formation wall, or between the casing string and another casing string,
 wherein the coating responds to temperature increases in the well in a manner that reduces stress induced in the cement sheath.

2. The method of claim 1, wherein the metal comprises an alloy comprising between about 32 wt % and 42 wt % Ni and between 58 wt % and 68 wt % Fe.

3. The method of claim 1, wherein the metal comprises an alloy comprising about 46 wt % Fe, 29 wt % Ni and 17 wt % Co.

4. The method of claim 1, wherein the well is a steam injection well.

5. The method of claim 1, wherein the casing comprises carbon steel, stainless steel, titanium, a nickel/chromium alloy or a nickel/copper alloy.

6. The method of claim 1, wherein the casing string comprises at least one section of casing comprising the metal, and at least one section of casing comprising carbon steel, stainless steel, titanium, a nickel and chromium alloy or a nickel and copper alloy.

7. The method of claim 1, wherein the cement sheath comprises water, an inorganic cement and one or more fillers having a thermal expansion coefficient lower than about $3\times10^{-6}/°$ C.

8. A method for establishing and maintaining zonal isolation in a subterranean well having a borehole, comprising:
 (i) installing into the borehole a casing string having a coating that covers an outside surface of the casing string, the coating comprising a metal having a coefficient of thermal expansion lower than $6\times10^{-6}/°$ C.; and
 (ii) placing a cement sheath between the exterior surface of the casing string and the formation wall, or between the exterior surface of the casing string and another casing string,
 wherein the coating responds to temperature increases in the well in a manner that reduces stress induced in the cement sheath.

9. The method of claim 8, wherein the metal comprises an alloy comprising between about 32 wt % and 42 wt % Ni and between 58 wt % and 68 wt % Fe.

10. The method of claim 8, wherein the metal comprises an alloy comprising about 46 wt % Fe, 29 wt % Ni and 17 wt % Co.

11. The method of claim 8, wherein the well is a steam injection well.

12. The method of claim 8, wherein the casing comprises carbon steel, stainless steel, titanium, a nickel/chromium alloy or a nickel and copper alloy.

13. The method of claim 8, wherein the casing string comprises at least one section of casing comprising the metal, and at least one section of casing comprising carbon steel, stainless steel, titanium, a nickel and chromium alloy or a nickel and copper alloy.

14. The method of claim 8, wherein the cement sheath comprises water, an inorganic cement and one or more fillers having a thermal expansion coefficient lower than $3\times10^{-6}/°$ C.

15. A well construction method, comprising:
 (i) drilling a borehole into the earth, thereby forming a subterranean well;
 (ii) installing into the borehole a casing string having a coating that covers an outside surface of the casting string, the coating comprising a metal having a coefficient of thermal expansion lower than $9\times10^{-6}/°$ C.; and
 (iii) placing a cement sheath between the exterior surface of the casing string and the formation wall, or between the exterior surface of the casing string and another casing string,
 wherein the coating responds to temperature increases in the well in a manner that reduces stress in the cement sheath.

16. The method of claim 15, wherein the metal comprises an alloy comprising between about 32 wt % and 42 wt % Ni and between 58 wt % and 68 wt % Fe.

17. The method of claim 15, wherein the metal comprises an alloy comprising about 46 wt % Fe, 29 wt % Ni and 17 wt % Co.

* * * * *